(12) United States Patent
Tabor et al.

(10) Patent No.: US 7,657,901 B2
(45) Date of Patent: Feb. 2, 2010

(54) SCANNING DEVICE FOR OPTICAL STORAGE MEDIA

(75) Inventors: Günter Tabor, Villingen-Schwenningen (DE); Reiner Baas, Steinach (DE); Rolf Dupper, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 722 days.

(21) Appl. No.: 11/368,689

(22) Filed: Mar. 6, 2006

(65) Prior Publication Data

US 2006/0200839 A1 Sep. 7, 2006

(30) Foreign Application Priority Data

Mar. 7, 2005 (DE) .................... 10 2005 010 868

(51) Int. Cl.
*G11B 7/00* (2006.01)
(52) U.S. Cl. ...................... 720/676; 720/680
(58) Field of Classification Search ............... 720/675, 720/676, 677, 680; 369/44.14, 44.22
See application file for complete search history.

(56) References Cited

U.S. PATENT DOCUMENTS

| 4,443,721 | A | * | 4/1984 | Jansen ............... 369/44.22 |
| 4,490,011 | A | * | 12/1984 | Houbregs et al. ......... 369/44.16 |
| 4,504,935 | A | * | 3/1985 | Jansen ............... 369/44.16 |
| 4,698,798 | A | * | 10/1987 | Faber et al. ............ 720/676 |
| 4,763,314 | A | * | 8/1988 | McCaslin et al. ......... 720/680 |
| 4,798,447 | A | * | 1/1989 | Jansen et al. ............ 359/824 |
| 5,138,605 | A | * | 8/1992 | Shtipelman et al. ......... 720/666 |
| 5,278,820 | A | * | 1/1994 | Shtipelman ............ 720/666 |
| 5,875,166 | A | * | 2/1999 | Ikegame et al. ......... 369/44.14 |
| 6,449,238 | B2 | * | 9/2002 | Furukawa et al. ........... 720/675 |
| 6,512,734 | B1 | * | 1/2003 | Chang et al. ............ 720/675 |
| 7,210,153 | B2 | * | 4/2007 | Mori et al. ............ 720/677 |
| 2007/0169139 | A1 | * | 7/2007 | Suzuki et al. ............ 720/703 |

FOREIGN PATENT DOCUMENTS

| EP | 0365070 | 4/1990 |
| EP | 1014349 A2 | 6/2000 |
| EP | 1189214 A2 | 3/2002 |
| EP | 1422699 A1 | 5/2004 |
| JP | 2000-285472 | 10/2000 |
| JP | 2004-185704 | 7/2004 |

* cited by examiner

*Primary Examiner*—Thang V Tran
(74) *Attorney, Agent, or Firm*—Robert D. Shedd; Harvey D. Fried; Patricia Verlangieri

(57) ABSTRACT

The invention relates to a scanning device for optical storage media, having an optical housing with sliding bearings, which are arranged at a distance from one another, for linear movement on a guide rod, and with optical components in order to form an optical path. It achieves the object of designing a scanning device such as this in such a way that its adjustment, associated with a setting of the optical path, is simplified and can be carried out precisely. For this purpose, each of the sliding bearings is formed from a sliding bearing bush which is held on a guide block, that is fixed to the housing, in such a way that it can be adjusted in a radial direction with respect to this guide block, and is self-aligning in a direction at right angles to this.

9 Claims, 3 Drawing Sheets

SCANNING DEVICE FOR OPTICAL STORAGE MEDIA

FIELD OF THE INVENTION

The invention relates to a scanning device for optical storage media, in particular for arrangement in an appliance for reading from and/or writing to optical storage media, which reads or writes information or data in one or more tracks on a storage medium. The storage medium may be a compact disc, which is known as a CD, a digital versatile disc, which is known as a DVD, a CD-ROM or DVD-ROM, a rewritable CD or DVD, or else any other optical recording medium.

BACKGROUND OF THE INVENTION

Optical scanning devices, which are also referred to as "pick-ups" and are a component of appliances for recording and/or for reproduction of information or data in or from one or more recording tracks on an optical storage medium, are known, for example, from EP 0 365 070. Appliances having a scanning device such as this are found in EP 1 014 349.

The respective scanning device is normally arranged on a carriage, which can be moved obliquely with respect to or at right angles to the recording track and is guided on at least one guide rod, or is designed to form such a carriage, and is connected to an electric-motor drive in order to achieve a high speed and high positioning accuracy, associated with a short access time to different points on the storage medium. In the appliance which is described in EP 1 014 349, the scanning device is attached by means of holding elements to a guide rod and to a drive shaft, which is driven by an electric motor. However, the carriage may also be coupled to a toothed rod which is driven by an electric motor via a gear wheel transmission. The guide rail and the drive shaft, and/or the toothed rod, as well as the electric motor are attached to a base plate, to which a disc motor is also attached, which drives a turntable for an optical storage medium. Guide blocks for linear movement of the guide rod are arranged on the carriage, and guide holes and/or sliding holes are incorporated in them.

Sliding bearings which may be based on different design principles are frequently arranged or formed in order to improve the sliding characteristics of the scanning device. Since the scanning device together with its components for guidance and alignment of a laser beam and their association with one another determines the so-called optical path, that is to say the path to the respective recording medium, it is helpful for not only the components of the scanning device to be adjustable, but also for them to be adjustable as a unit with respect to the optical storage medium.

In addition to the capability to adjust the sliding bearings on the guide rod or rods with piezoelectric elements and spring means arranged in the sliding bearings, and thus to determine the radial position and the inclination of the respective sliding bearing with respect to the guide rod, as is the case with the scanning device described in JP-2001-357553, it is also possible to use sliding bearing bushes. For this purpose, JP-62-001127 describes a carriage arrangement with a bearing block (guide block) with two sliding bearing bushes which are separated from one another, are on the same axis and are arranged on a guide rod, in which case the common axis of the sliding bearing bushes may also be inclined with respect to the guide block. The sliding bearing bushes are adjusted with respect to the guide rod by movement of the entire guide block.

The sliding bearing bushes are normally pushed into or else adhesively bonded in the holes. Because of the required positioning accuracy for the scanning device, the diameters of the sliding bearings, their parallelity with respect to the guide axis and their coaxiality must be very accurate. In this case, tolerance problems and concentricity problems may occur between the two holes for the sliding bearing bushes, and these problems are transferred to the sliding bearing bushes. Furthermore, the process of pushing them in may reduce their very accurate internal diameter, thus adversely affecting their capability to slide on the guide rod.

SUMMARY OF THE INVENTION

One object of the invention is to design a scanning apparatus for optical storage media according to the precharacterizing clause of claim 1 in such a way that its adjustment, associated with the adjustment of the optical path, is simplified and can be carried out precisely.

In the case of a scanning apparatus according to the precharacterizing clause of claim 1, this object is achieved by the characterizing features of this claim. Advantageous refinements are described in the dependent claims.

The invention consists in that, in the case of a scanning device for optical storage media, which has an optical housing with sliding bearings, which are arranged at a distance from one another, for linear movement on a guide rod, and is provided with optical components, for example a collimator lens, a focus lens, a DVD grating and a CD grating, in order to form an optical path, the sliding bearings are in each case formed from a sliding bearing bush which is held on a guide block, that is fixed to the housing, in such a way that they can be adjusted in a radial direction with respect to the guide block and are held, in a self-aligning manner, in a direction at right angles to this.

A sliding bearing with sliding bearing bushes is thus created, whose arrangement is free of retaining holes on the same axis for them, whose formation involves tolerance and concentricity problems, and which can adversely affect the sliding bearing bushes when pressed into them, in terms of the radial dimensions, in particular with respect to the internal diameter and thus with respect to the sliding capability. Furthermore, the sliding bearing attachment and configuration are simple and technologically less complex, and the scanning device can be adjusted precisely via the sliding bearings, and this adjustment process can be carried out more easily. The sliding bearings and thus at the same time the overall scanning device are advantageously aligned along a guide rod on the appliance side, thus making the coaxiality of the scanning device considerably more precise. The self-alignment of the sliding bearing bushes on one of two vertical planes thus also leads to the process of adjustment of the optical path being simplified. Furthermore, the scanning device can be arranged without any problems on a guide rod with a different diameter, in that sliding bearing bushes are used with an internal diameter which corresponds to the external diameter of the respective guide rod.

A holder for a sliding bearing bush is advantageously formed on each guide block and has a contact surface which is fixed to the guide block and a movable contact surface, which is arranged at right angles to this, and at least one spring means, by means of which the sliding bearing bush is held on these contact surfaces. The guide block may in this case be arranged on a guide attachment which is formed parallel to the base surface of the optical housing, and on which the contact surface which is fixed to the guide block is formed, on the housing side, on a guide wall which is integrally formed at right angles. The movable contact surface is then arranged between this and the housing, parallel to the plane on which the guide attachment extends, and is formed in a simple manner by the front surface of an adjustment screw.

The at least one spring means rests with a contact element, which transmits spring force, tangentially on the circumference of the sliding bearing bush and acts on this essentially in the direction of the angle bisector between the contact surfaces. The sliding bearing bush is in this way pressed uniformly against the two contact surfaces, and is held in its nominal position. This contact element may advantageously be formed on a spring clip, which clasps the holder and has a latching connection to the guide block in a predetermined position.

A securing wall, which is integrally formed on the housing side at a distance from and parallel to the guide wall, is used to secure the arrangement of the scanning apparatus on the guide rod, is arranged at a short distance from the sliding bearing bush, with the holder being U-shaped, and has at least one securing hook, which points towards the housing, is integrally formed in the area between the guide blocks, and partially surrounds the guide rod, at a short distance from it. These means prevent the sliding bearing arrangement being broken in the event of major vibration, but in particular in the event of an impact on the appliance for reading from and/or writing to optical recording media, whose component the scanning apparatus is.

BRIEF DESCRIPTION OF THE DRAWINGS

The invention will be explained in the following text with reference to one exemplary embodiment. In the associated drawings.

DETAILED DESCRIPTION OF PREFERRED EMBODIMENTS

Figure 1:
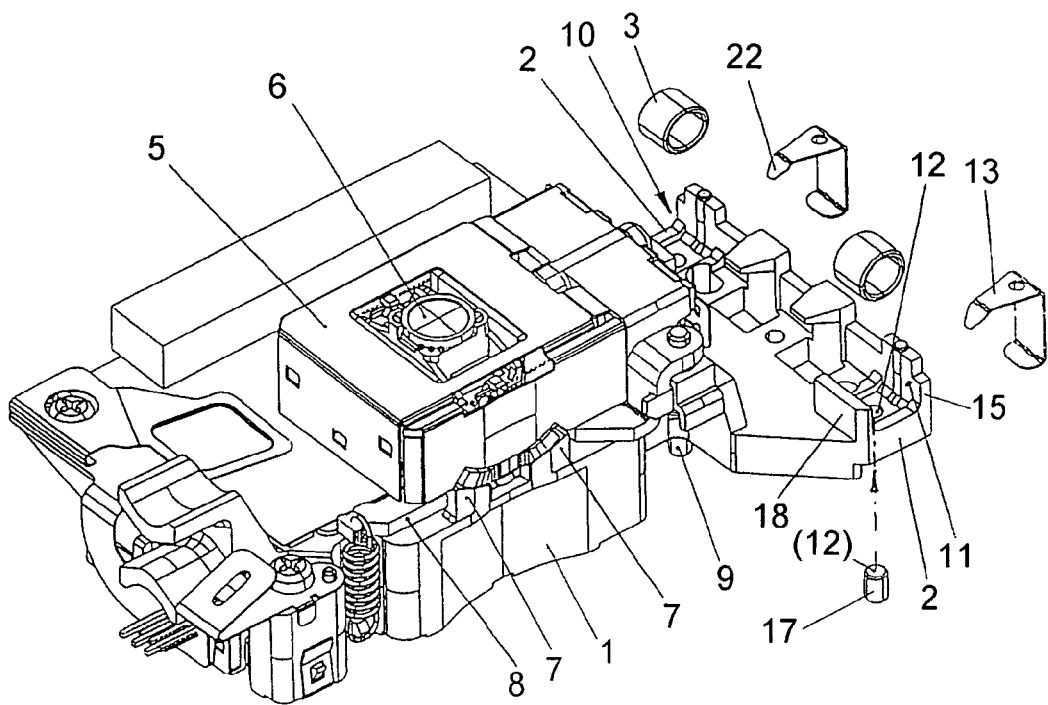
FIG. 1 shows a perspective view of a scanning device with a sliding bearing arrangement, illustrated as an exploded view.
Figure 2:
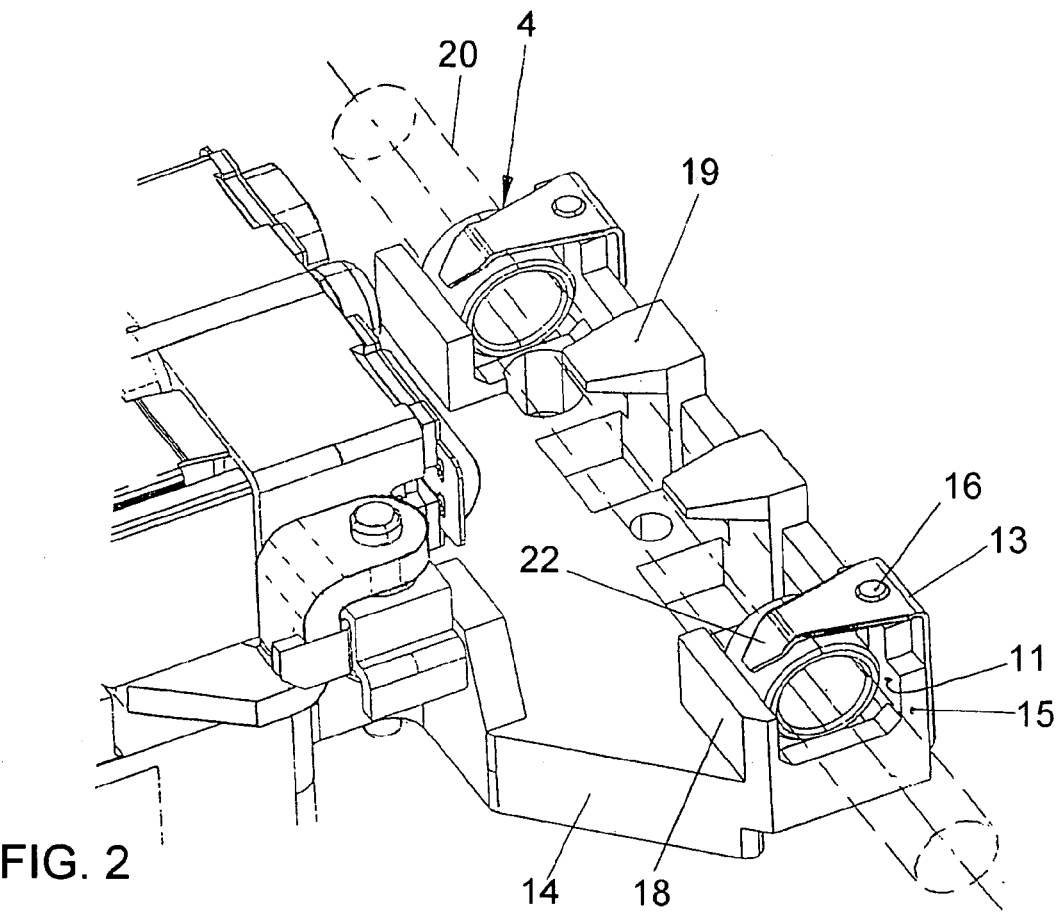
FIG. 2 shows the sliding bearing arrangement in the installed state, enlarged.

The scanning device shown in FIGS. 1 and 2 for optical storage media has an optical housing 1 in the form of a zinc casting with two guide blocks 2, which are fixed to the housing, for the arrangement of in each case one sliding bearing bush 3 in order to form a sliding bearing (4, FIG. 2) for linear movement of the scanning device on a guide rod (20, FIG. 2), which is indicated in FIG. 2, and with a scanning head 5 with a focus lens 6. The scanning head 5 is firmly connected to a mount 8, which is concealed by the scanning head and is held movably on sliding blocks 7 on the housing 1. An adjustment screw 9, which is supported on the housing 1 and acts on the mount 8 at a distance from the sliding blocks 7, is provided in order to move the mount 8.

A holder 10 for a sliding bearing bush 3 is formed on each of the guide blocks 2 and, in each case in the radial direction with respect to it, has a contact surface 11 which is fixed to the guide block and a movable contact surface 12, which is arranged at right angles to it, as well as a spring clip 13/22, which has a latching connection to the guide block 2, for pressing the respective sliding bearing bush 3 against the contact surfaces 11 and 12, and for clasping the holder 10.

The guide blocks 2 are arranged on a guide attachment 14, which is formed parallel to the base surface of the housing 1, with the contact surface 11 which is fixed to the guide block for the holder 10 being arranged on the side facing the optical housing 1, on a guide wall 15, which is integrally formed at right angles to the guide attachment 14 and on which a latching bolt 16 for the latching connection of the spring clip 13 is also arranged, and, together with the movable contact surface 12, these items are formed parallel to the plane on which the guide attachment 14 extends. The movable contact surface 12 is formed by the front surface of an adjustment screw 17, which is arranged in the guide attachment 14. The holders 10 are furthermore bounded by a securing wall 18 which is integrally formed on the housing side at a distance from and parallel to the guide wall 15, and is at a short distance from the guide rod 20. Two securing hooks 19, which point in the direction of the housing, are integrally formed on the guide attachment 14 in the area between the guide blocks 2, surround the guide rod 20 at a short distance from it, and hold the scanning device together with the securing walls 18 on the guide rod 20, in the event of a shock load.

Figure 3:
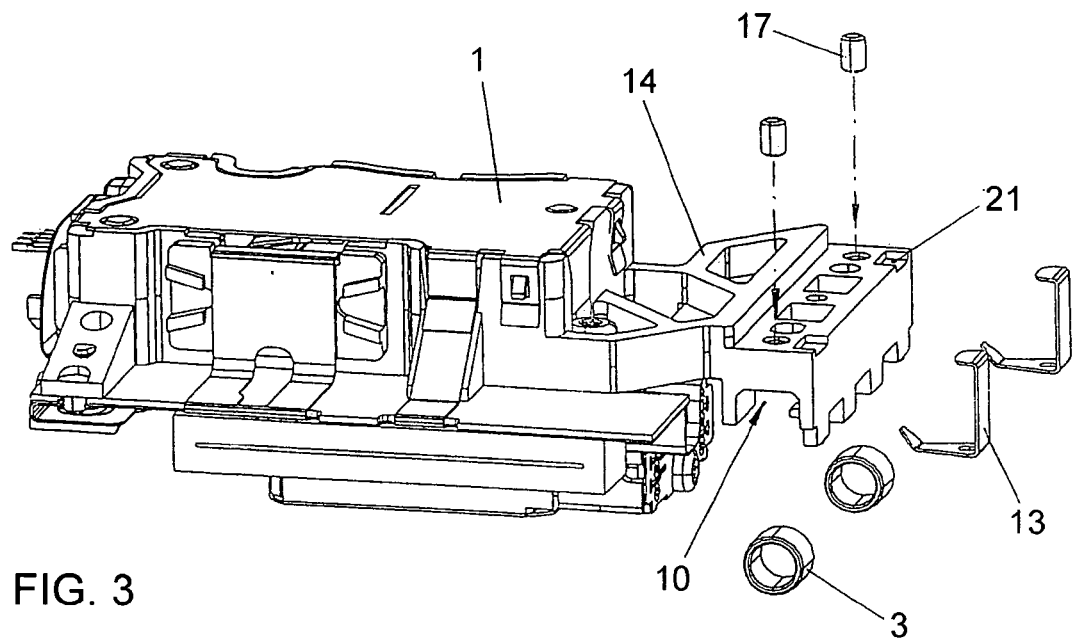
FIG. 3 shows a perspective view from underneath of the scanning device with the sliding bearing arrangement illustrated in the form of an exploded view.
Figure 4:
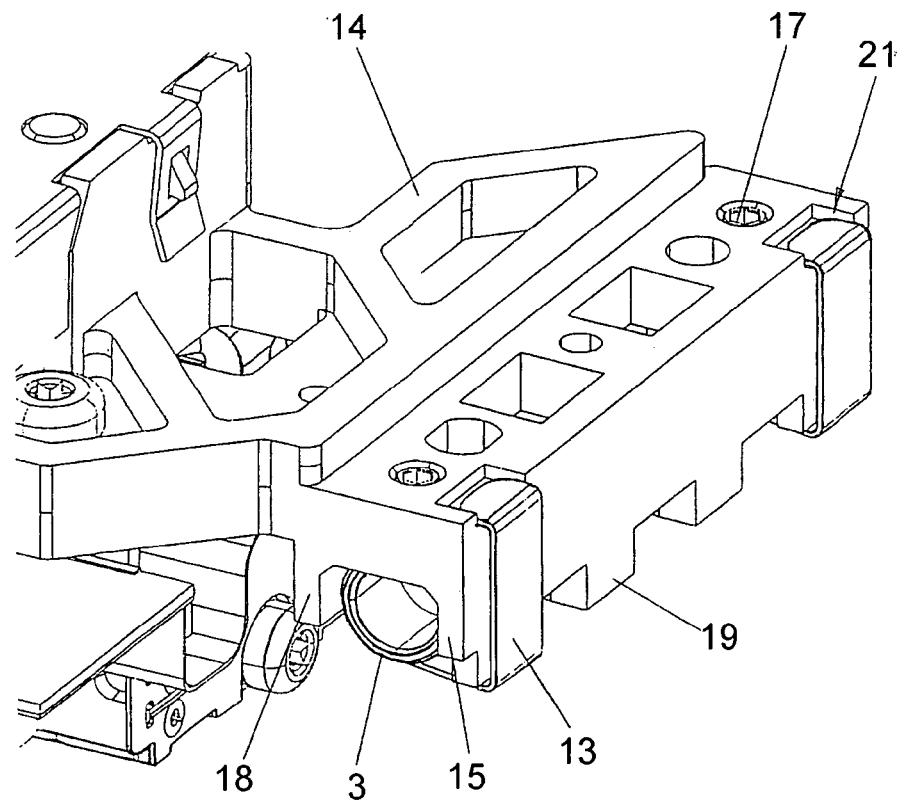
FIG. 4 shows the view from underneath with sliding bearings fitted.

FIGS. 3 and 4 show the guide attachment 14 in a perspective view from underneath. This figure shows the two adjustment screws 17, which are each provided with an internal hexagonal recess for an adjusting tool, and the arrangement of the spring clips 13, which each engage in a recess 21 formed on the lower face of the guide attachment 14.

Figure 5:
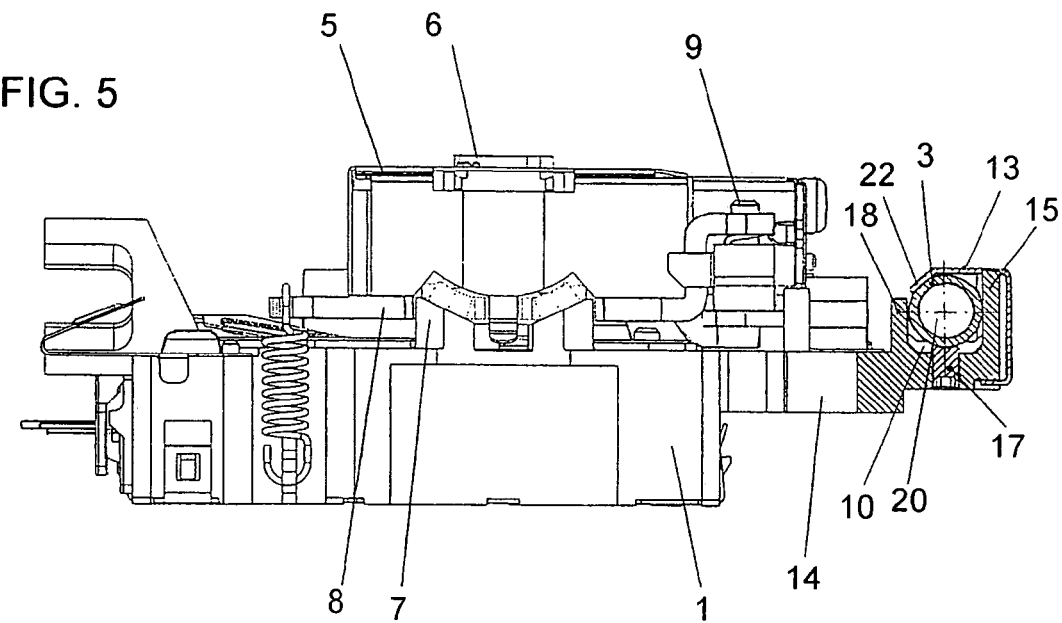
FIG. 5 shows a section through one of the sliding bearing arrangements, transversely with respect to the guide axis.
Figure 6:
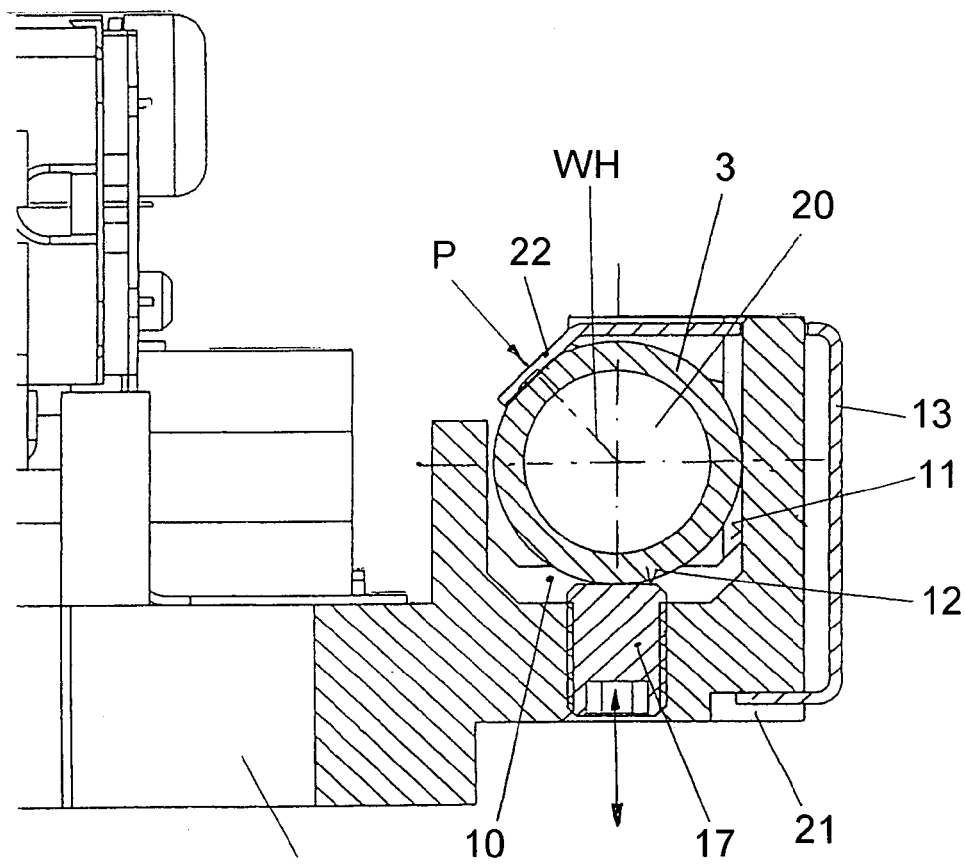
FIG. 6 shows this section, enlarged.

FIGS. 5 and 6 show a side view of the scanning device with a section through a guide block 2, with a holder 10, which is formed on it, for a sliding bearing bush 3. As can be seen from the section viewed, the spring clip 13 has a contact element, which transmits spring force, in the form of an angled contact tongue 22, which is integrally formed at the free end on that limb of the spring clip 13 which clasps the sliding bearing bush 3. This contact tongue rests tangentially on the sliding bearing bush 3 and in the process essentially intersects the angle bisector WH between the two contact surfaces 11 and 12, so that the spring force (P) acts on the sliding bearing bush 3 in the direction of this angle bisector (WH), and presses the sliding bearing bush 3 against the contact surfaces 11 and 12 with essentially identical force components. The sliding bearing bush 3 in this case rests on the planar front surface of the adjustment screw 17—the contact surface 11. The position of the guide attachment 14 and thus of the entire scanning device with respect to the sliding bearing bush 3, which is arranged on the guide rod 20, can be adjusted by means of the adjustment screw or screws 17 parallel to the contact surface 11. The guide attachment 14 and thus the scanning apparatus in the transverse direction thereto are, in contrast, automatically aligned by means of the spring clip 13.

What is claimed is:

1. Scanning device for an optical storage medium, having an optical housing with sliding bearings, which are arranged at a distance from one another, for linear movement on a guide rod, and with optical components in order to form an optical path, wherein each of the sliding bearings is formed from a sliding bearing bush, which is held on a guide block that is fixed to the housing, wherein a holder for the sliding bearing bush is formed on the guide block, the holder having a contact surface, which is fixed to the guide block, a movable contact surface, and at least one spring means for holding the sliding bearing bush on these contact surfaces, wherein the contact surface is arranged at right angles to the movable contact surface.

2. Scanning device according to claim 1, wherein the guide block is arranged on a guide attachment which is formed parallel to the base surface of the optical housing, and in that the contact surface, which is fixed to the guide block, of the holder is formed on a guide wall, which is integrally formed at right angles on the guide attachment, and the movable contact surface is formed parallel to the plane on which the guide attachment extends.

3. Scanning device according to claim 1, wherein the contact surface is formed by the front surface of an adjustment screw which is arranged in the guide attachment.

4. Scanning device according to claim 1, wherein the holder is bounded by a securing wall, which is integrally formed on the housing side at a distance from and parallel to the guide wall.

5. Scanning device according to claim 1, wherein the spring means has a contact element, which transmits spring force, for tangential contact with the circumference of the sliding bearing bush, with the spring force being applied essentially in the direction of angle bisectors between the contact surfaces.

6. Scanning device according to claim 5, wherein the spring means is formed from a spring clip which clasps the holder and whose end area is in the form of a contact element in order to form a tongue.

7. Scanning device according to claim 6, wherein the spring clip has a latching connection to the guide block.

8. Scanning device according to claim 1, wherein at least one securing hook which points towards the housing is integrally formed in the area between the guide blocks and partially surrounds the guide rod at a short distance from the guide rod.

9. Appliance for reading from and/or writing to optical storage media, with a scanning device for optical storage media, having an optical housing with sliding bearings, which are arranged at a distance from one another, for linear movement on a guide rod, and with optical components in order to form an optical path, wherein each of the sliding bearings is formed from a sliding bearing bush, which is held on a guide block that is fixed to the housing, wherein a holder for the sliding bearing bush is formed on the guide block, the holder having a contact surface, which is fixed to the guide block, a movable contact surface, and at least one spring means for holding the sliding bearing bush on these contact surfaces, wherein the contact surface is arranged at right angles to the movable contact surface.

* * * * *